(12) United States Patent
Kato et al.

(10) Patent No.: US 6,724,714 B1
(45) Date of Patent: Apr. 20, 2004

(54) HEAD FEEDING MECHANISM

(75) Inventors: Kazunari Kato, Fukushima (JP); Toshiyuki Fukushima, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 759 days.

(21) Appl. No.: 09/661,076

(22) Filed: Sep. 13, 2000

(30) Foreign Application Priority Data

Oct. 7, 1999 (JP) .......................................... 11-287242

(51) Int. Cl.[7] .............................................. G11B 17/30
(52) U.S. Cl. ...................................... 369/219; 369/215
(58) Field of Search ................................. 369/215, 219; 360/267.6, 267.7

(56) References Cited

U.S. PATENT DOCUMENTS

| | | | | |
|---|---|---|---|---|
| 5,682,282 A | * | 10/1997 | Kato ....................... | 360/266.3 |
| 6,046,974 A | * | 4/2000 | Uehara ..................... | 369/219 |
| 6,058,098 A | * | 5/2000 | Kato ........................ | 369/219 |
| 6,373,812 B2 | * | 4/2002 | Kim et al. ................. | 369/219 |
| 6,414,933 B1 | * | 7/2002 | Anada et al. .............. | 369/219 |
| 2001/0038600 A1 | * | 11/2001 | Obara ....................... | 369/249 |

* cited by examiner

Primary Examiner—George J. Letscher
Assistant Examiner—Mark Blouin
(74) Attorney, Agent, or Firm—Brinks Hofer Gilson & Lione

(57) ABSTRACT

A head feeding mechanism which includes a screw shaft adapted to rotate in the normal and reverse directions using a motor as a drive source, a nut member engaged with the screw shaft, and a spring member connected to a head and adapted to elastically press the nut member against the screw shaft and which causes the head to reciprocate in the thrust direction of the screw shaft through the intermediation of the nut member through rotation of the screw shaft. The nut member has a substantially cylindrical female screw engaged with a male screw of the screw shaft, and the nut member is elastically biased in both the radial direction and the thrust direction of the screw shaft by the spring member. In this construction, if the elastic biasing force in the radial direction of the spring member holding the nut member in pressing contact with the screw shaft is set small, the female screw of the nut member does not move over the male screw of the screw shaft, so that a small torque suffices for the motor rotating the screw shaft, which is effective in achieving a reduction in the size of the motor and the entire head feeding mechanism including the motor. Further, the thrust play of the nut member due to backlash is removed, making it possible to prevent a malfunction attributable to external vibration, such as a dropout.

18 Claims, 4 Drawing Sheets

HEAD FEEDING MECHANISM

BACKGROUND OF THE INVENTION

1. Field of the Invention

The present invention relates to a feeding mechanism for feeding an optical pickup, a magnetic head or the like in the radial direction of a disk and, in particular, to a head feeding mechanism suitable for achieving a reduction in size.

2. Description of the Related Art

When recording on and/or reproducing information from a disk such as a CD (compact disk), an MD (mini disk), an FD (floppy disk) or the like by using an optical pickup, a magnetic head or the like, it is necessary to feed the optical pickup, the magnetic head or the like in the radial direction of the disk. FIG. 6 shows a conventionally known head feeding mechanism.

In FIG. 6, numeral 1 indicates a carriage for an optical pickup (head) P including an objective lens 2, the carriage 1 being arranged between a guide shaft 3 and a screw shaft 4. The guide shaft 3 and the screw shaft 4 are arranged parallel and opposed to each other, and the screw shaft 4 is rotated in the normal and reverse directions by a thread motor M. On either side surface of the carriage, there protrude receiving portions 1a and 1b. One receiving portion 1a abuts the peripheral surface of the guide shaft 3, and the other receiving portions 1b are engaged by the screw shaft 4. Further, a plate spring 5 is fastened to the carriage 1 by a screw, and this plate spring 5 extends in a direction perpendicular to the axis of the screw shaft 4. A half nut 6 formed of synthetic resin and having a U-shaped cross-sectional shape is mounted to the forward end of the plate spring 5, and a female screw formed in the semi-cylindrical inner peripheral surface of the half nut 6 is held in pressing contact with the male screw of the screw shaft 4 and in mesh therewith due to the elastic force of the plate spring 5.

In the optical pickup feeding mechanism, generally constructed as described above, when the screw shaft 4 is rotated by the thread motor M in either the normal or the reverse direction, the torque is converted to a linear movement by the half nut 6, and transmitted to the carriage 1, so that the carriage 1, supporting the half nut 6 through the intermediation of the plate spring 5, moves in the axial direction of the guide shaft 3 and the screw shaft 4, whereby the entire optical pickup P is fed in the radial direction (to the inner or outer periphery) of the disk (not shown) to perform recording on and/or reproduction of information from the disk.

In the conventional technique described above, the female screw formed in the semi-cylindrical inner peripheral surface of the half nut 6 is held in pressing contact with the male screw of the screw shaft 4 due to the elastic force of the plate spring 5, whereby the torque of the screw shaft 4 is converted to a linear movement by the half nut 6 and transmitted to the carriage 1. Thus, the elastic biasing force of the plate spring 5 must be set to be larger than a certain level to ensure the engagement of the screw shaft 4 with the half nut 6. Thus, a relatively large torque is also required of the thread motor M, which is the drive source for the screw shaft 4.

Recently, there is a trend for in-car or portable CD players, MD players, floppy disk apparatuses and the like to be reduced in size. As a result, there is a demand for reducing the size of the thread motor, screw shaft, etc. used in the head feeding mechanism for the optical pickup, the magnetic head or the like. However, when a reduction in the size of the thread motor and the screw shaft is thus promoted, the torque of the thread motor is reduced, so that it is necessary to set the elastic biasing force of the plate spring, which holds the half nut in pressing contact with the screw shaft, to be small. Further, when the diameter of the screw shaft is reduced, the difference between the outer diameter and root diameter of the male screw formed on the outer peripheral surface of the screw shaft is reduced, and the difference between the inner diameter and root diameter of the female screw of the half nut is also inevitably reduced. For this reason, in the above-described conventional technique, when the size of the optical pickup feeding mechanism is reduced, it can happen that the female screw of the half nut moves over the male screw of the screw shaft due to vibration or the like transmitted from the exterior of the device. Or, due to the backlash required between the screws of the half nut and the screw shaft, the half nut is liable to move in the thrust direction of the screw shaft, resulting in a malfunction such as a dropout.

SUMMARY OF THE INVENTION

According to the present invention, there is provided a head feeding mechanism which includes a screw shaft adapted to rotate in the normal and reverse directions using a motor as a drive source, a nut member engaged with the screw shaft, and a spring member connected to a head and adapted to elastically press the nut member against the screw shaft and which causes the head to reciprocate in the thrust direction of the screw shaft through the intermediation of the nut member through rotation of the screw shaft, wherein the nut member has a substantially cylindrical female screw engaged with a male screw of the screw shaft, and wherein the nut member is elastically biased in both the radial direction and the thrust direction of the screw shaft by the spring member.

In this construction, if the elastic biasing force in the radial direction of the spring member, which holds the nut member in pressing contact with the screw shaft, is set to be small, there is no fear of the female screw of the nut member moving over the male screw of the screw shaft, so that a small torque suffices for the motor which rotates the screw shaft, which is effective in reducing the size of the motor and of the entire head feeding mechanism including this motor. Further, since the nut member is biased in the thrust direction of the screw shaft by the spring member, the thrust play of the nut member attributable to backlash is removed, and it is possible to prevent a malfunction such as a dropout from being generated by external vibration.

In the above-described construction, it is desirable to form on the spring member a joint portion to be held in pressing contact with the side surface of the nut member and an engagement portion to be engaged with the male screw of the screw shaft, and to elastically bias the nut member in the thrust direction of the screw shaft by the elastic force between the joint portion and the engagement portion. This makes it possible to reliably impart a biasing force in the thrust direction to the nut member with a simple construction.

In this case, it is desirable to provide the spring member with a first elastic arm extending to the screw shaft side using the head side as a stationary end, and a second elastic arm extending from the first elastic arm in the thrust direction of the screw shaft, and to form the joint portion on the free end side of the first elastic arm and form the engagement portion on the free end side of the second elastic arm. In this construction, it is possible to secure the requisite spring length of each of the first and second elastic arms, so that the elastic force which biases the nut member in the radial direction and the thrust direction of the screw shaft is easy to adjust, and it is possible to reduce variation in the elastic biasing force in each direction.

DESCRIPTION OF THE PREFERRED EMBODIMENTS

An embodiment of the present invention will be described with reference to the drawings.

Figure 6:
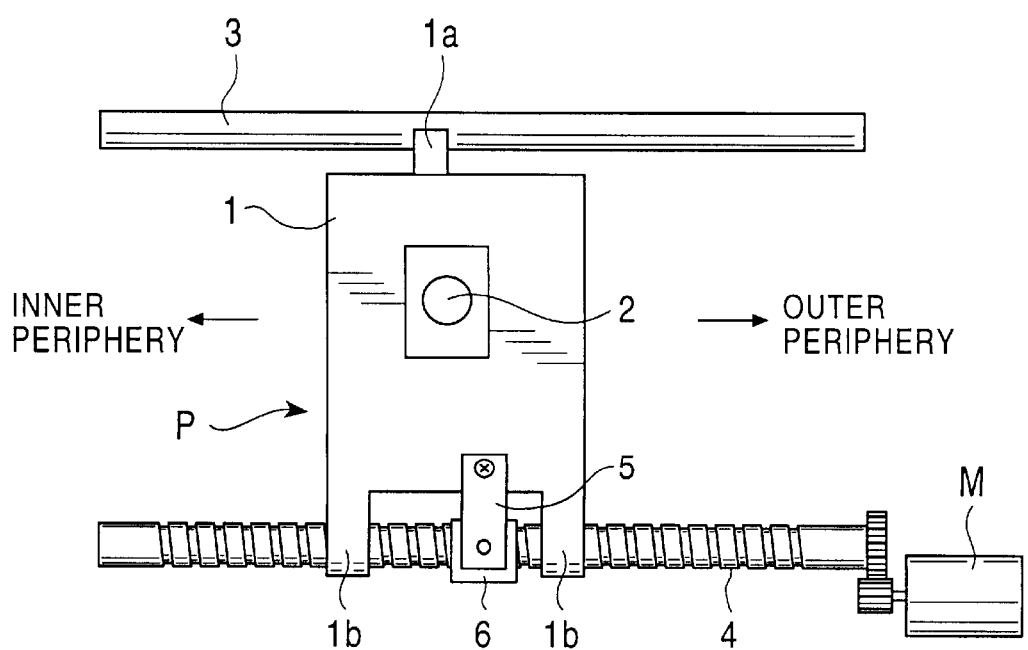
FIG. 6 is a schematic diagram showing a conventional optical pickup feeding mechanism.

In the drawings, numeral 10 indicates a carriage for an optical pickup (head) consisting of an objective lens 11 and a light emitting device, a photo detector, etc. (not shown). The carriage 10 reciprocates in the axial direction (thrust direction) of a guide shaft 12 and a screw shaft 13. The guide shaft 12 and the screw shaft 13 are arranged parallel and opposed to each other, and the screw shaft 13 rotates in the normal and reverse directions using a thread motor M (See FIG. 6) as the drive source. Further, a spindle motor 14 is provided on the inner periphery side with respect to the moving direction of the carriage 10, and a turntable 15 is firmly attached to the rotation shaft of the spindle motor 14. A disk such as a CD or an MD (not shown) is centered with respect to the turntable 15 and rotated, with information being recorded on and/or reproduced from the disk by an optical pickup P.

Figure 5:
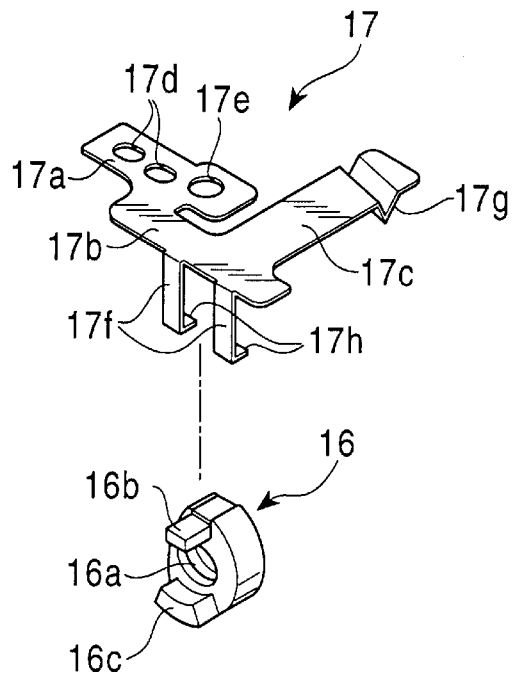
FIG. 5 is an exploded perspective view of the nut member and the spring member provided in the head feeding mechanism.

From the end surfaces of the carriage 10, one receiving portion 10a and two receiving portions 10b protrude. One receiving portion 10a abuts the peripheral surface of the guide shaft 12, and the other receiving portions 10b are engaged by the screw shaft 13. A nut member 16 formed of synthetic resin is threadedly engaged with the screw shaft 13. As shown in FIG. 5, formed in the nut member 16 is a completely cylindrical female screw 16a which is adapted to engage with the male screw 13a of the screw shaft 13. Further, on one side surface of the nut member 16, an engagement protrusion 16b and an arcuate protrusion 16c are integrally formed, and the other side surface of the nut member 16 abuts the receiving portion 10b of the carriage 10.

Figure 3:
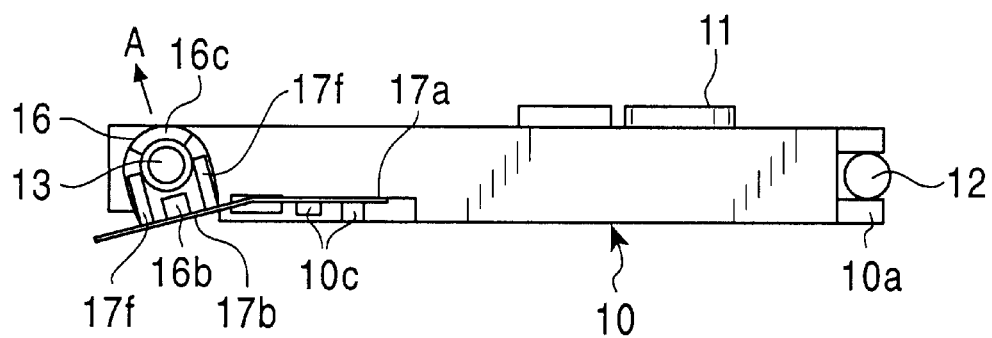
FIG. 3 is a side view of the head feeding mechanism.
Figure 4:
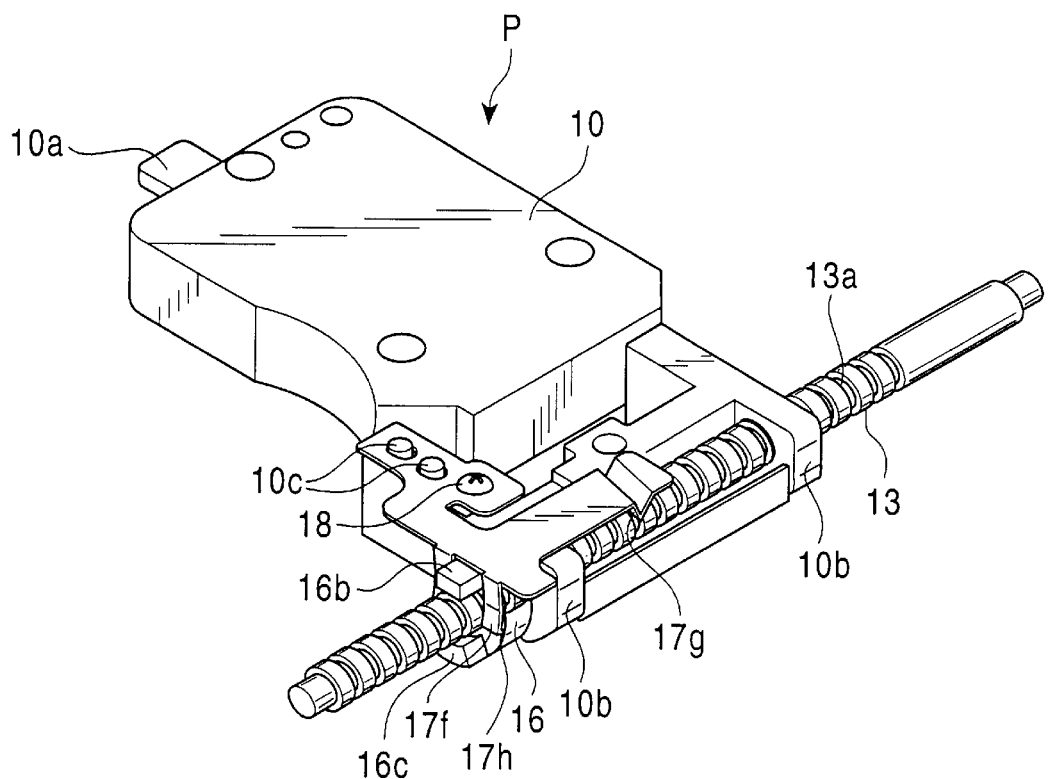
FIG. 4 is a perspective view of the head feeding mechanism.

Fastened to the back surface of the carriage 10 is a plate spring (spring member) 17 consisting of an elastic thin plate of stainless steel, and this plate spring 17 includes a mounting portion 17a, a first elastic arm 17b and a second elastic arm 17c, formed integrally. Provided in the mounting portion 17a are two positioning holes 17d and one circular hole 17e (see FIG. 5). Pins 10c protruding from the carriage 10 are inserted into the positioning holes 17d and a fastening screw 18 is inserted into the circular hole 17e and threadedly engaged therewith, whereby the mounting portion 17a of the plate spring 17 is accurately fastened to the carriage 10 (see FIG. 4). The mounting portion 17a side of the first elastic arm 17b, that is, the carriage 10 side thereof, is the stationary end, and it extends in a cantilever-like fashion in a direction perpendicular to the screw shaft 13. The free end side thereof is held in pressing contact with the peripheral surface of the nut member 16, whereby the nut member 16 is elastically biased in the radial direction (the direction of the arrow A in FIG. 3) of the screw shaft 13.

Figure 1:
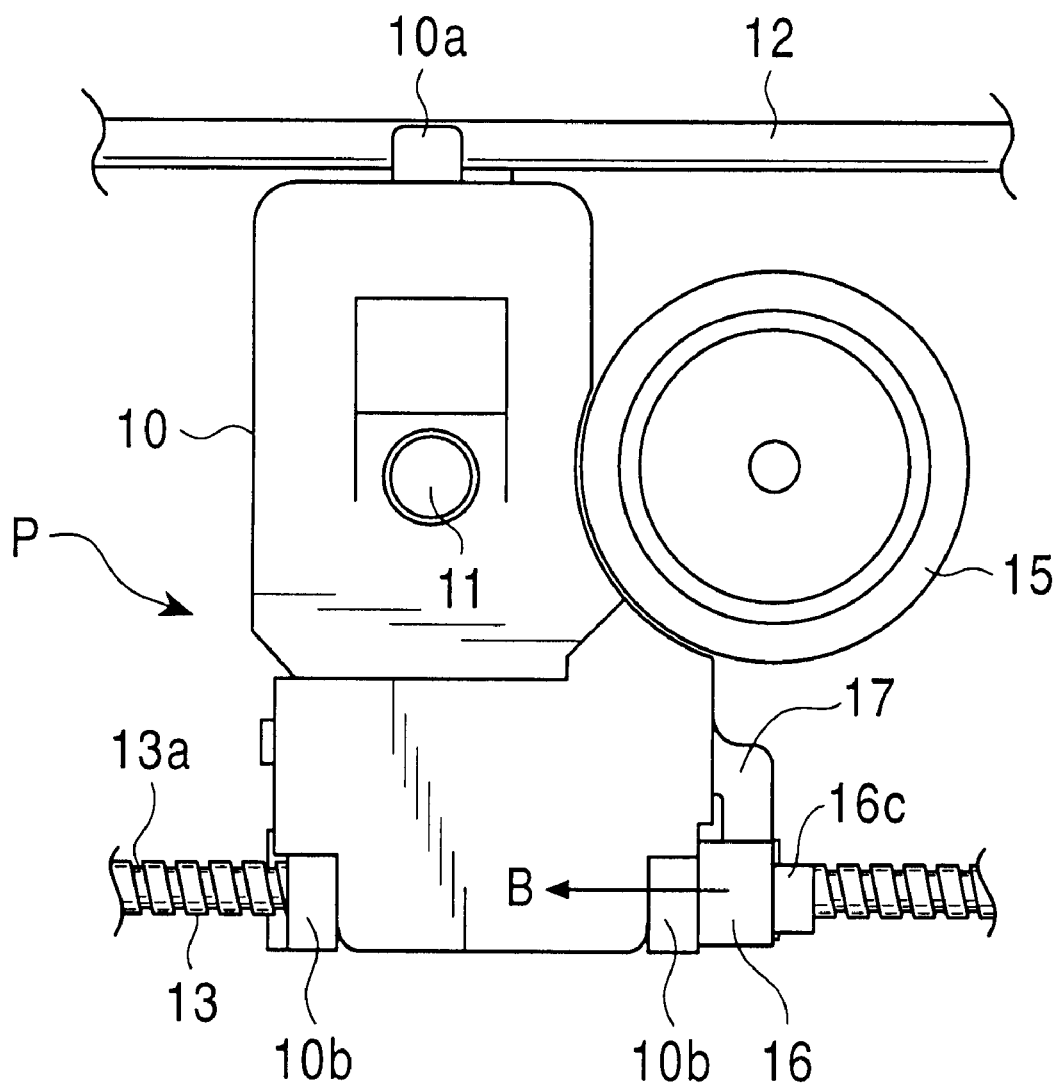
FIG. 1 is plan view of a head feeding mechanism according to an embodiment of the present invention as seen from the front side.
Figure 2:
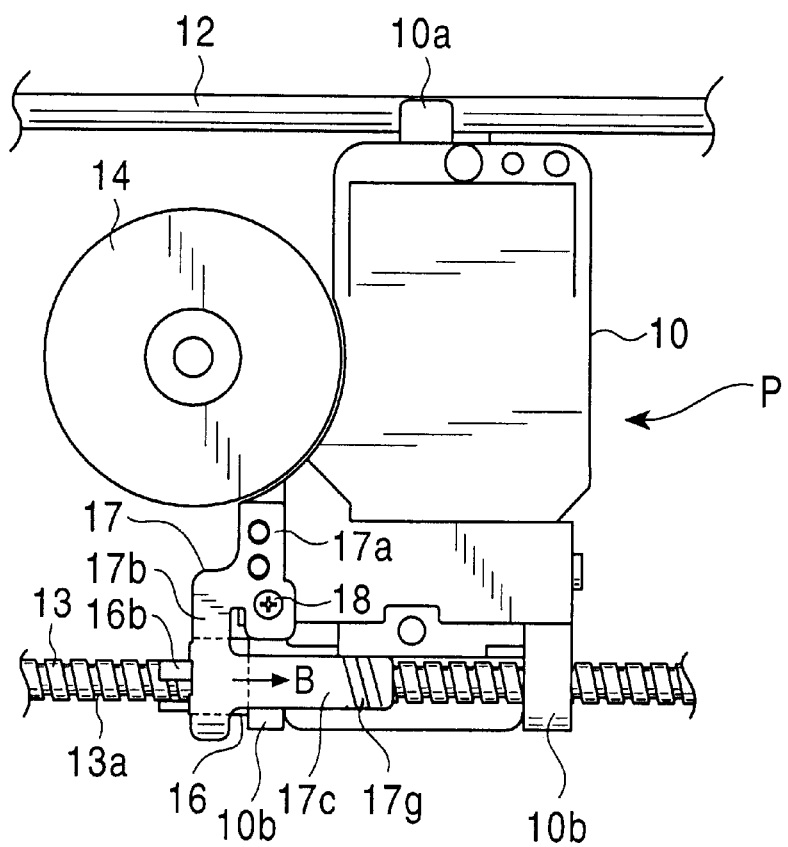
FIG. 2 is a bottom view of the head feeding mechanism.

Further, on the side end surface on the free end side of the first elastic arm 17b, there are formed, by bending at right angles, a pair of joint members (joint portions) 17f which extend in the radial direction of the screw shaft 13. These joint members 17f pass on both sides of the engagement protrusion 16b and face one side surface of the nut member 16. At the forward ends of the joint members 17f, there are provided joint claws 17h formed by bending toward the nut member 16. The forward ends of the joint claws 17h are held in pressing contact with the nut member 16, and the nut member 16 is elastically biased in the thrust direction (the direction of the arrow B in FIGS. 1 and 2) of the screw shaft 13, and it is pressed against the receiving portion 10b of the carriage 10.

The second elastic arm 17c extends from the free end side of the first elastic arm 17b so as to be parallel to the thrust direction of the screw shaft 13, and a V-shaped engagement portion 17g is formed by bending at the forward end thereof. This engagement portion 17g receives an elastic force from the second elastic arm 17c and is engaged with the male screw 13a of the screw shaft 13. The distance between the engagement portion 17g and the forward ends of the joint claws 17h is set such that in the assembled state shown in FIG. 4, the joint members 17f are somewhat deflected so as to be separated from the nut member 16. Thus, a stable side pressure in the direction of the arrow B is applied from the joint claws 17h to the nut member 16.

Since the engagement protrusion 16b of the nut member 16 is positioned between the joint members 17f of the plate spring 17, the nut member 16 is prevented from rotating with the screw shaft 13, and it is possible to reliably convert the torque of the screw shaft 13 to a linear movement. That is, the joint members 17f of the plate spring 17 also function as a rotation restricting portion for preventing the rotation of the nut member 16 relative to the screw shaft 13.

In the optical pickup feeding mechanism, generally constructed as described above, when the screw shaft 13 rotates in the normal or reverse direction using the thread motor M as the drive source, the torque is converted to a linear movement by the nut member 16. The nut member 16, the plate spring 17 and the carriage 10 then reciprocate along the axial direction of the guide shaft 12 and the screw shaft 13, whereby the entire optical pickup P is fed in the radial direction of the disk (not shown), and the recording on and/or reproduction of information from the disk is conducted.

The female screw 16a of the nut member 16 in mesh with the male screw 13a of the screw shaft 13 is of a completely cylindrical configuration, and there is no fear of disengagement of the male screw 13a of the screw shaft 13 from the female screw 16a of the nut member 16. Therefore, it is possible to reduce the elastic biasing force of the plate spring 17 biasing the nut member 16 in the radial direction, making it possible to achieve a reduction in the torque of the thread motor M, that is, a reduction in the size thereof. Further, it is possible to conform to a reduction in the diameter of the screw shaft 13. The configuration of the female screw 16a of the nut member 16 is not restricted to a completely cylindrical configuration, however. An arcuate configuration of over 180 degrees which does not permit disengagement with the male screw 13a of the screw shaft 13 is sufficient.

Due to the elastic force between the engagement portion 17g and the joint members 17f (joint claws 17h) of the plate spring 17, the nut member 16 is elastically biased in the thrust direction of the screw shaft 13. Further, the engagement portion 17g is engaged with the male screw 13a of the screw shaft 13, so that the side pressure in the thrust direction is applied to the nut member 16 in a stable manner to make it possible to remove the thrust play. This makes it possible to reliably prevent the occurrence of a malfunction such as a dropout attributable to external vibration. Further, the first elastic arm 17b of the plate spring 17 extends in a cantilever-like fashion from the mounting portion 17a, and the second elastic arm 17c extends from the first elastic arm 17b along the axial direction of the screw shaft 13, so that it is possible to secure a sufficient spring length for the plate spring 17 without sacrificing space. Also, it is easy to adjust the elastic force for biasing the nut member 16 in the radial direction and the thrust direction of the screw shaft 13 and, further, it is possible to restrain variation of the biasing force in these directions.

While in the above-described embodiment the present invention is applied to an optical pickup for recording on and/or reproducing information from an optical disk such as a CD, MD or DVD (digital versatile disk), the present invention is also applicable to a feeding mechanism for a magnetic head for recording on and/or reproducing information from a magnetic disk such as a floppy disk.

The present invention, as described above, provides the following advantages.

The female screw of the nut member in mesh with the male screw of the screw shaft has a substantially cylindrical configuration, so that, if the elastic biasing force in the radial direction of the spring member which holds the nut member in pressing contact with the screw shaft is set small, there is no fear of the nut member moving over the male screw of the screw shaft. Therefore, a small torque suffices for the motor which rotates the screw shaft, which is effective in achieving a reduction in the size of the motor and the head feeding mechanism including this motor.

Further, since the nut member is elastically biased in both the radial direction and the thrust direction of the screw shaft by the spring member, the thrust play of the nut member attributable to backlash is removed, whereby it is possible to prevent a malfunction such as a dropout attributable to external vibration.

What is claimed is:

1. A head feeding mechanism which includes a screw shaft adapted to rotate in the normal and reverse directions using a motor as a drive source, a nut member engaged with the screw shaft, and a spring member connected to a head and adapted to elastically press the nut member against the screw shaft and which causes the head to reciprocate in the thrust direction of the screw shaft through the intermediation of the nut member through rotation of the screw shaft,
wherein the nut member has a substantially cylindrical female screw engaged with a male screw of the screw shaft, and wherein the nut member is elastically biased in both the radial direction and the thrust direction of the screw shaft by the spring member.

2. A head feeding mechanism according to claim 1, wherein there are formed on the spring member a joint portion held in pressing contact with a side surface of the nut member and an engagement portion engaged with the male screw of the screw shaft, and wherein the nut member is elastically biased in the thrust direction of the screw shaft by the elastic force between the joint portion and the engagement portion.

3. A head feeding mechanism according to claim 2, wherein there are provided on the spring member a first elastic arm extending to the screw shaft side, with its head side portion being the stationary end, and a second elastic arm extending from the first elastic arm in the thrust direction of the screw shaft, and wherein the joint portion is formed on the free end side of the first elastic arm, and the engagement portion is formed on the free end side of the second elastic arm.

4. A head feeding mechanism according to claim 3, wherein the spring member is formed of a plate spring on which the first elastic arm and the second elastic arm are integrally provided, wherein the engagement portion is formed by bending on the free end side of the second elastic arm, and wherein the joint portion is formed by bending toward the radial direction of the screw shaft from the free end side of the first elastic arm.

5. A head feeding mechanism according to claim 3, wherein the free end side of the first elastic arm is held in pressing contact with the peripheral surface of the nut member, whereby the nut member is elastically biased in the radial direction of the screw shaft.

6. A head feeding mechanism according to claim 1, wherein the spring member is provided with a rotation restricting portion which is engaged with the nut member to prevent the nut member from rotating with the screw shaft.

7. A head feeding mechanism according to claim 1, wherein the female screw of the nut member is arcuate and extends over 180 degrees.

8. A head feeding mechanism which includes a screw shaft adapted to rotate in the normal and reverse directions using a motor as a drive source, a nut member engaged with the screw shaft, and a spring member connected to a head and adapted to elastically press the nut member against the screw shaft and which causes the head to reciprocate in the thrust direction of the screw shaft through the intermediation of the nut member through rotation of the screw shaft,
wherein the nut member has a substantially cylindrical female screw engaged with a male screw of the screw shaft, and wherein there are formed on the spring member a joint portion held in pressing contact with a side surface of the nut member and an engagement portion engaged with the male screw of the screw shaft, and wherein the nut member is elastically biased in the thrust direction of the screw shaft by the elastic force between the joint portion and the engagement portion.

9. A head feeding mechanism according to claim 8, wherein there are provided on the spring member a first elastic arm extending to the screw shaft side, with its head side portion being the stationary end, and a second elastic arm extending from the first elastic arm in the thrust direction of the screw shaft, and wherein the joint portion is formed on the free end side of the first elastic arm, and the engagement portion is formed on the free end side of the second elastic arm.

10. A head feeding mechanism according to claim 9, wherein the spring member is formed of a plate spring on which the first elastic arm and the second elastic arm are integrally provided, wherein the engagement portion is formed by bending on the free end side of the second elastic arm, and wherein the joint portion is formed by bending toward the radial direction of the screw shaft from the free end side of the first elastic arm.

11. A head feeding mechanism according to claim 9, wherein the free end side of the first elastic arm is held in pressing contact with the peripheral surface of the nut member, whereby the nut member is elastically biased in the radial direction of the screw shaft.

12. A head feeding mechanism according to claim 8, wherein the spring member is provided with a rotation restricting portion which is engaged with the nut member to prevent the nut member from rotating with the screw shaft.

13. A head feeding mechanism according to claim 8, wherein the female screw of the nut member is arcuate and extends over 180 degrees.

14. A head feeding mechanism which includes a screw shaft adapted to rotate in the normal and reverse directions using a motor as a drive source, a nut member engaged with the screw shaft, and a spring member connected to a head and adapted to elastically press the nut member against the screw shaft and which causes the head to reciprocate in the thrust direction of the screw shaft through the intermediation of the nut member through rotation of the screw shaft, wherein the nut member has a substantially cylindrical female screw engaged with a male screw of the screw shaft, wherein there are provided on the spring member a first elastic arm extending to the screw shaft side, with its head side portion being the stationary end, and a second elastic arm extending from the first elastic arm in the thrust direction of the screw shaft, wherein a joint portion is formed on the free end side of the first elastic arm, and an engagement portion is formed on the free end side of the second elastic arm, and wherein the nut member is elastically biased in the thrust direction of the screw shaft by the elastic force between the joint portion and the engagement portion.

15. A head feeding mechanism according to claim 14, wherein the spring member is formed of a plate spring on which the first elastic arm and the second elastic arm are integrally provided, wherein the engagement portion is formed by bending on the free end side of the second elastic arm, and wherein the joint portion is formed by bending toward the radial direction of the screw shaft from the free end side of the first elastic arm.

16. A head feeding mechanism according to claim 14, wherein the free end side of the first elastic arm is held in pressing contact with the peripheral surface of the nut member, whereby the nut member is elastically biased in the radial direction of the screw shaft.

17. A head feeding mechanism according to claim 14, wherein the spring member is provided with a rotation restricting portion which is engaged with the nut member to prevent the nut member from rotating with the screw shaft.

18. A head feeding mechanism according to claim 14, wherein the female screw of the nut member is arcuate and extends over 180 degrees.

* * * * *